UNITED STATES PATENT OFFICE.

MARK L. COWAN, OF EDDY, TEXAS.

PROCESS OF MOUNTING PICTURES.

SPECIFICATION forming part of Letters Patent No. 660,892, dated October 30, 1900.

Application filed March 23, 1900. Serial No. 9,933. (No specimens.)

*To all whom it may concern:*

Be it known that I, MARK L. COWAN, a citizen of the United States, residing at Eddy, in the county of McLennan and State of Texas, have invented certain new and useful Improvements in Processes of Making Medallion Pictures; and I do hereby declare the following to be a full, clear, and exact description of the invention, such as will enable others skilled in the art to which it appertains to make and use the same.

The object of this invention is the production of a variety of pictures presenting a lovely and beautiful effect and of substantial and durable quality at the lowest possible cost, the product having the appearance of the highest art.

A vital feature of the process resides in its capability of preserving photographs and like prints and imparting a fresh, vigorous, and animated look thereto and to convert ordinary lithographic prints into pictures closely resembling high-grade productions.

In practicing the invention ordinary panes of glass the size of the picture, print, or lithograph to be mounted are selected, cleaned, and polished by being rubbed with powdered pumice-stone. A half-pound of white glue is dissolved in one quart of boiling water, to which is added one tablespoonful of spirits of ammonia and one tablespoonful of white sugar. A thin coat of this mixture is applied hot, by means of a brush or sponge, to one side of the glass plate, after which the print, picture, or photograph is placed upon the coated side of the glass and the latter and the print passed between rubber pressure-rollers, by means of which the print is caused to adhere firmly and closely to the glass and all traces of air and surplus solution are excluded. The pressure may be applied in any desired way, the manner indicated being the simplest and most expeditious and uniform, and hence is preferred. Sugar when dissolved produces a colorless liquid possessing adhesive properties and forms a firm bond between polished surfaces. Glue, as is well known, tends to contract and when applied to glass causes the surface to chip. The addition of sugar to the solution of glue or paste coacts to prevent the chipping effect and eminently fits the adhesive for the purpose intended. Ammonia tends to enliven and give tone to an otherwise dead surface and heightens the effect and when combined with the paste and sugar causes them to impart a luster to the picture not otherwise obtainable. A coating is next prepared by dissolving in hot water two parts "Church's Alabastine" to one part plaster-of-paris, forming a mixture about the consistency of cream or a thick paint. This mixture is applied hot to the back of the print by means of a brush or other suitable means. This coating excludes air and prevents dampness affecting the picture. Any good calcimine may be used instead of "Church's Alabastine."

Having thus described the invention, what is claimed as new is—

The herein-described method of making medallion pictures, which consists in applying to a polished glass plate a heated transparent paste containing ammonia and sugar, placing the print on the coated side of the glass and subjecting it to pressure to exclude all air, and finally coating the rear of the article with a plastic solution adapted to harden and permanently exclude air from the print and paste.

In testimony whereof I affix my signature in presence of two witnesses.

MARK L. COWAN. [L. S.]

Witnesses:
CLAUDE B. HALL,
D. C. HILL.